United States Patent
Shah

(10) Patent No.: US 11,475,441 B2
(45) Date of Patent: Oct. 18, 2022

(54) BLOCKCHAIN-ENABLED SERVICE DELIVERY EVIDENCE SYSTEM

(71) Applicant: Netspective Communications LLC, Silver Spring, MD (US)

(72) Inventor: Shahid N. Shah, Silver Spring, MD (US)

(73) Assignee: Netspective Communications LLC, Silver Spring, MD (US)

( * ) Notice: Subject to any disclaimer, the term of this patent is extended or adjusted under 35 U.S.C. 154(b) by 206 days.

(21) Appl. No.: 16/045,530

(22) Filed: Jul. 25, 2018

(65) Prior Publication Data
US 2020/0034836 A1  Jan. 30, 2020

(51) Int. Cl.
*G06Q 20/38* (2012.01)
*G06Q 20/02* (2012.01)
*G06Q 40/08* (2012.01)
*H04W 4/14* (2009.01)
*H04W 4/02* (2018.01)

(52) U.S. Cl.
CPC ......... *G06Q 20/3829* (2013.01); *G06Q 20/02* (2013.01); *G06Q 40/08* (2013.01); *H04W 4/02* (2013.01); *H04W 4/14* (2013.01)

(58) Field of Classification Search
CPC .... G06Q 20/3829; G06Q 20/02; G06Q 40/08; G06Q 20/389; G06Q 2220/00; G06Q 20/223; H04W 4/14; H04W 4/02
See application file for complete search history.

(56) References Cited

U.S. PATENT DOCUMENTS

| | | |
|---|---|---|
| 2003/0220835 A1* | 11/2003 | Barnes, Jr. ............ H04M 1/724 705/14.36 |
| 2012/0215553 A1 | 8/2012 | Leston |
| 2013/0226607 A1 | 8/2013 | Woody et al. |
| 2015/0324943 A1 | 11/2015 | Han et al. |
| 2016/0342989 A1* | 11/2016 | Davis ................. G06Q 20/3827 |
| 2016/0379157 A1 | 12/2016 | Nassar et al. |
| 2017/0039623 A1* | 2/2017 | Boraski ................ G06Q 10/087 |
| 2018/0191665 A1* | 7/2018 | Alieiev ................... H04L 51/38 |
| 2019/0075102 A1* | 3/2019 | Kim ...................... H04L 9/3239 |

FOREIGN PATENT DOCUMENTS

| | | |
|---|---|---|
| AU | 2018100150 A4 | 3/2018 |
| WO | 2002041163 A1 | 5/2002 |
| WO | 2013054350 A2 | 4/2013 |
| WO | WO-2014072739 A1 * | 5/2014 ....... H04N 21/47202 |

* cited by examiner

*Primary Examiner* — Patrick McAtee
*Assistant Examiner* — Vincent I Idiake
(74) *Attorney, Agent, or Firm* — Rahman LLC

(57) ABSTRACT

A system is provided for automated recording of evidence of delivery of a service in a service setting. The system includes a mobile communication device, a web-based interaction component, and a service control system. The system includes a service interface device to generate an electronic signal. The electronic signal includes a first SMS transmitted to the mobile communication device and a second SMS transmitted to the service control system. The electronic signal also includes a first secured hash link executable by the mobile communication device, wherein executing the link records a first electronic evidence of service delivery. The electronic signal includes a second secured hash link executable by the service control system, wherein executing the second link records a second electronic evidence of service delivery.

13 Claims, 7 Drawing Sheets

BLOCKCHAIN-ENABLED SERVICE DELIVERY EVIDENCE SYSTEM

BACKGROUND

Technical Field

The embodiments herein generally relate to electronic recording systems, and more particularly to a blockchain-enabled electronic evidence recording system for use in computer-controlled service deliveries.

Description of the Related Art

In service ecosystems, when a third-party payment claim is made, such as for example, when a service is delivered to a person and a third party such as an insurance company is billed for the service, it often becomes difficult to verify that the service was actually delivered to the person by a service provider. There's no way currently to provide evidence that the service was actually conducted and for how long.

Therefore, in light of the above, there is a need of a system and a method for providing electronic evidences maintained with independence that may not be tampered and can be relied upon by the user, service provider and the third party.

SUMMARY

An embodiment herein provides a computer-controlled system for automated recording of evidence of a delivery of a service in a service setting. The system includes a mobile communication device associated with a user and proximately located to the user upon the delivery of the service. The computer-controlled system includes a web-based interaction component located remotely from the mobile communication device to collect predefined information about the mobile communication device and the associated user. The predefined information includes at least a first computer-executable input indicative of an identifier of the mobile communication device and the associated user, and a second computer-executable input indicative of a service sought for the delivery in the service setting. A trigger is initiated upon electronic receipt of the first computer-executable input and the second computer-executable input by the web-based interaction component.

The computer-controlled system includes a service control system that includes one or more central servers, data stores, and cloud-based computing components for managing and processing the delivery of services in the service setting by a service provider to the user associated with the mobile communication device. The computer-controlled system includes a service interface device coupled to the web-based interaction component, wherein the service interface device generates an electronic signal transmitted to the mobile communication device using a transmission circuit, and wherein the electronic signal allows communication between the mobile communication device and the service control system.

The electronic signal includes a first short message service component (SMS), wherein the service interface device transmits the first SMS to the mobile communication device upon activation of the trigger in the service setting. The first SMS is indicative of start of a service. The electronic signal includes a second short message service component (SMS). The service interface device transmits the second SMS to the service control system upon activation of the trigger in the service setting. The second SMS is indicative of start of the service. The electronic signal includes a first secured hash link contained within the first SMS and executable by the mobile communication device, wherein executing the link records a first electronic evidence of service delivery associated with the mobile communication device. The first electronic evidence of service delivery is one of an event, a digitally executable location input, a digitally executable voice input, and a digital image. The electronic signal includes a second secured hash link contained within the second SMS and executable by the service control system, wherein executing the second link records a second electronic evidence of service delivery associated with the service control system. The second electronic evidence of service delivery is one of an event, a digitally executable location, a digitally executable location voice input, and a digital image.

The web-based interaction component further sends a confirmation electronic message along with a unique service proof token (SPT) to the mobile communication device and the service control system upon completion of the service delivery after selection of the first secured hash link and the second secured hash link respectively by the mobile communication device and the service control system. The unique SPT associated with each of the mobile communication device and the service control system is indicative of completion and delivery of the service by the service control system to the user associated with the mobile communication device.

The computer-controlled system includes a blockchain device configured to automatically store computer-executable instructions including digitally executable SPT associated with the mobile communication device and the service control system. The computer-controlled system includes a central verification device to verify the first evidence of service delivery and the second evidence of service delivery by retrieving the unique SPT from the blockchain device upon a request for a verified evidence, such that a verification by the central verification device determines whether one or more services were performed in the service setting. In an embodiment, the mobile communication device, the service control system, and the central verification device may be allowed to access discrete portions of data elements including the computer executable instructions stored within the blockchain device based on access rights through respective blockchain access points such that an access to the data elements allows one or more of viewing, locally replicating, and digitally sharing the data elements at least in part.

The at least one of the first electronic evidence of service delivery and the second electronic evidence of service delivery may be an event.

The at least one of the first electronic evidence of service delivery and the second electronic evidence of service delivery may be a location-based evidence.

The at least one of the first evidence of service delivery and the second evidence of service delivery may be a voice-based evidence.

The at least one of the first electronic evidence of service delivery and the second electronic evidence of service delivery may be an image-based evidence.

The computer-controlled system may include a first Global Positioning System (GPS) communicatively connected with the central verification device, wherein the first GPS records location coordinates of the service control system.

The first GPS may be contained within the service control system and may be configured to communicate with the central verification device.

The blockchain device may store the location coordinates of the service control system along with time stamped computer-executable information associated with receipt of the location coordinates of the service control system.

The computer-controlled system may include a second Global Positioning System (GPS) communicatively connected with the central verification device, wherein the second GPS records location coordinates of the mobile communication device.

The second GPS may be contained within the mobile communication device and may be configured to communicate with the central verification device.

The blockchain device may store the location coordinates of the mobile communication device along with time stamped computer-executable information associated with receipt of the location coordinates of the mobile communication device.

The blockchain device may include a blockchain database to store the SPT associated with the mobile communication device and the control system in a computer executable format.

The SPT may include a first SPT associated with the mobile communication device and representing a start of service proof token for receipt of the service by the user associated with the mobile communication device. The SPT may also include a second SPT associated with the mobile communication device and representing an end of service proof token for receipt of the service by the user associated with the mobile communication device. The SPT may also include a third SPT associated with the service control system and representing a start of service proof token for delivery of the service by the service control system. The SPT may also include a fourth SPT associated with the service control system and representing an end of service proof token for delivery of the service by the service control system.

The central verification device may retrieve the first SPT, the second SPT, the third SPT, and the fourth SPT for verification of the electronic evidence of service delivery.

The central verification device may be communicatively coupled with a rules engine, wherein the rules engine defines a set of computer-executable rules to verify proof of evidences based on the occurrence of the event, receipt of the digitally executable location information, receipt of the digitally executable voice input, or receipt of the digital image input.

The central verification device may process an electronic transaction if the evidence is verified in accordance with the set of computer-executable rules.

The rules engine may include at least one rule that identifies an entity that pays for a service and verification information requested by the entity as proof that a particular service was performed through the digitally stored SPT associated with the user of the mobile communication device.

The blockchain device may include a processing circuit to generate a network identifier associated with a blockchain network, a transaction ID (identifier), a blockchain address identifier using at least a unique key included in a transaction request and one or more hashing codes including the SPT associated with the respective mobile communication device and the service control system, an electronic transaction message, wherein the electronic transaction message may include a plurality of data elements, including at least a first data element configured to store a proof of transaction as the evidence reserved for private use upon request for verification by the central verification device, and a transmitting device configured to transmit the electronic transaction message to the mobile communication device and the service control system for private use.

The blockchain address identifier may be based on a public key corresponding to a private key that may be used to register the transaction on the blockchain device. The public key and the private key are a public/private key pair associated with the transaction indicative of the delivery of the service in the service setting.

A computer-controlled system is provided for digitally recording an evidence of a service delivery in a service setting. The system includes a web-based interaction component to collect predefined information about: a mobile communication device and an associated user who are at a service receiving end, wherein the predefined information includes at least a first computer-executable input indicative of an identifier of the mobile communication device and the associated user, and a second computer-executable input indicative of a service sought for delivery in the service setting, wherein a trigger is initiated upon receipt of the first computer-executable input and the second computer-executable input by the web-based interaction component; and a service control system at a service delivery end, wherein the service control system includes one or more central servers, data stores, and cloud-based computing components for managing and processing delivery of services in the service setting by a service provider to the user associated with the mobile communication device.

The system further includes a service interface device coupled to the web-based interaction component. The service interface device generates an electronic signal transmitted to the mobile communication device using a transmission circuit. The electronic signal allows communication with the mobile communication device and the service control system. The electronic signal includes a first short message service component (SMS), wherein the service interface device sends the first SMS to the mobile communication device upon activation of the trigger in the service setting. The first SMS is indicative of start of a service. The electronic signal also includes a second short message service component (SMS), wherein the service interface device sends the second SMS to the service control system upon activation of the trigger in the service setting. The second SMS is indicative of start of the service.

The electronic signal includes a first secured hash link contained within the first SMS and executable by the mobile communication device or the associated user, wherein executing the link automatically records a first electronic evidence of service delivery associated with the mobile communication device. The electronic signal includes a second secured hash link contained within the second SMS and executable by the service control system, wherein executing the second link automatically records a second electronic evidence of service delivery associated with the service control system.

The web-based interaction component further sends a confirmation electronic message along with a unique service proof token (SPT) to the mobile communication device and the service control system upon completion of the service delivery after executing the first secured hash link and the second secured hash link respectively by the mobile communication device and the service control system. The unique SPT associated with each of the mobile communication device and the service control system is indicative of completion and delivery of the service by the service control system to the user associated with the mobile communication device.

The system further includes a blockchain device configured to automatically store computer-executable instructions comprising digitally executable SPT associated with the mobile communication device and the service control system.

The system includes a central verification device to verify the first electronic evidence of service delivery and the second electronic evidence of service delivery by retrieving the unique SPT from the blockchain device, such that verification by the central verification device determines whether one or more services were performed in the service setting. The system includes a global positioning system (GPS) communicatively connected with the central verification device, wherein the GPS records a first set of location coordinates corresponding to the mobile communication device and a second set of location coordinates corresponding to the service control system. The first set of location coordinates and the second set of location coordinates are stored in the blockchain along with the SPT such that the first set of location coordinates and the second set of location coordinates serve as the first electronic evidence of service delivery and the second electronic evidence of service delivery.

The mobile communication device, the service control system, and the central verification device may be allowed to access discrete portions of data elements including the computer executable instructions stored within the blockchain device based on access rights through respective blockchain access points such that an access to the data elements allows one or more of viewing, locally replicating, and digitally sharing the data elements at least in part.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
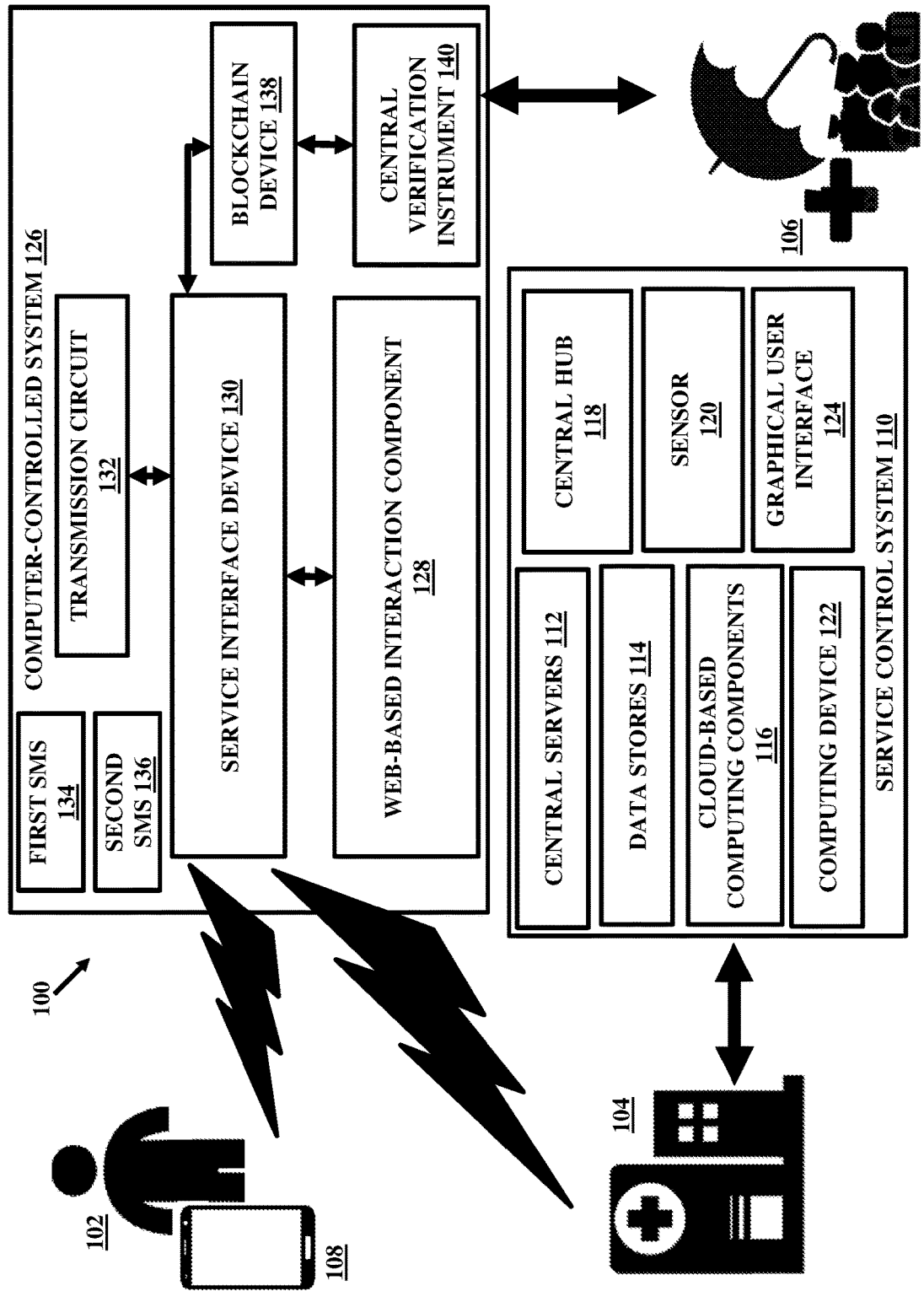
FIG. 1 illustrates, among other things, an example of an environment or architecture in which various embodiments herein may operate.

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a system and method for digitally recording evidences for service delivery in a service setting. Referring now to the drawings, and more particularly to FIGS. 1 through 7, where similar reference characters denote corresponding features consistently throughout the figures, there are shown preferred embodiments.

FIG. 1 illustrates generally, but not by way of limitation, among other things, an example of an environment or architecture 100 in which various embodiments herein may operate. As illustrated in FIG. 1, the environment 100 comprises a first entity 102, a second entity such as a service provider 104, a third entity (also referred to as a third party) 106, operating through a digital framework in accordance with the invention for delivery of certain services through computerized systems in the service setting. In accordance with various embodiments of the invention, a variety of service settings may be employed for applying teachings of the embodiments herein in various embodiments.

The first entity 102 is associated with a smart-capability device such as a smart phone or a mobile phone or any other device 108 configured to perform certain functions as disclosed in the document hereafter. For the purposes of describing the embodiments herein, the document refers to the use of a mobile communication device 108 associated with the first entity 102 in an embodiment without limitations.

The mobile communication device 108 may be located proximate to the first entity (also referred to as user interchangeably) 102.

The second entity (referred to as service provider interchangeably without limitations) 104 is associated with a service control system 110. The service control system 110 may include one or more central servers 112, data stores 114, and cloud-based computing components 116 for digitally managing and processing computer-controlled delivery of services in the service setting by the service provider 104 to the first entity 102 associated with the mobile communication device 108.

In an embodiment, the service control system 110 may be configured as a cloud-based service control system 110. The cloud-based service control system 110 may further include a central hub 118 to communicate over wired and wireless connections with different elements of the service control system 110 and associated data stores 114. The cloud-based service control system 110 includes a sensor 120 in wireless bi-directional communication with the central hub 118 to allow sensing of various service delivery parameters. The cloud-based service control system 110 may also include a computing device 122 in bi-directional communication with the central hub 118. The computing device 122 may include a graphical user interface 124 to allow display of data received from the sensor and/or other devices 120 such that the second entity 104 or a user with permissions may control the delivery of services through the graphical user interface 124. The various devices and components of the service control system 110 allow delivery of the services by the second entity 104 to the first entity 102 in a computerized manner.

A plurality of wireless and/or wired communications that enable real-time information sharing, constant availability, and interoperability are used in the service setting for allowing delivery of the services. Additionally, greater situational awareness is facilitated to allow transparency through live video, voice communication, sensor, and location data information.

The embodiments herein allow recording of the evidences digitally in a computer-executable format with the use of a computer-controlled system 126 for automated recording of the evidences of the service delivery within the service setting. The system (also called as recording system interchangeably without limitations) 126 includes a web-based interaction component 128, located remotely from the mobile communication device 108, to collect predefined information about the mobile communication device 108 and the associated user 102. The system 126 also includes a service interface device 130 coupled to the web-based interaction component 128.

The predefined information collected by the web-based interaction component 128 includes at least a first computer executable input indicative of an identifier of the mobile communication device 108 and the associated user 102, and a second computer executable input indicative of a service sought for delivery in the service setting by the second entity 104 to the first entity 102. For example, the identifier of the mobile communication device 108 can be a unique code of the mobile communication device 108 or a unique subscriber identity module or subscriber identification module associated with the mobile communication device 108. A trigger is initiated upon receipt of the first computer executable input and the second computer executable input by the web-based interaction component 128 from the mobile communication device 108. The trigger causes entry of a registration of a service request in the service control system 110 for delivery according to a set of defined service rules. The trigger may be a signal that causes initiation of a registration request or a submission of a registration form for the user 102 associated with the mobile communication device 108 and the like.

In an embodiment, when a user 102 arrives in the service setting for requesting the service within the computerized ecosystem 100, a registration is needed. The trigger initiated upon receipt of the first computer executable input and the second computer executable input may serve as a registration request for the user 102 and a registration request may be entered into the system of the service provider such as the service control system 110 in a digital format accordingly. Registration details may be sent to the user 102 and the service provider 104 through either an email or SMS or any other medium.

The service interface device 130 is coupled to the web-based interaction component 128 communicatively and/or operatively. The service interface component 130 generates an electronic signal that may be transmitted to the mobile communication device 108 and the service control system 110 using a transmission circuit 132. The electronic signal allows communication of the service interface device 130 and/or the web-based interaction component 128 with the mobile communication device 108 and the service control system 110. The electronic signal may include and/or convey a first short message service component (first SMS) 134 and a second short message service component (second SMS) 136. If the service control system 110 denies the request for the registration, then the service interface component 130 receives a return signal from the service control system 110 terminating the connection between the mobile communication device 108 and the service control system 110. Such a denial of the request for the registration may occur if the service control system 110 detects unauthorized use of the mobile communication device 108 by an entity other than the user 102; e.g., through fingerprint or retinal scan, etc. Also, the user 102 may terminate the registration request on the mobile communication device 108 due to any number of reasons.

The service interface device 130 generates the electronic signal to send the first SMS 134 to the mobile communication device 108 when a trigger is activated in the service setting that represents registration of a request by a user such as 102 for a predefined service. The first SMS 134 sent from the service interface device is indicative of start of a service, in an embodiment. In an embodiment, the first SMS 134 may indicate approval of the registration which leads to start of the service.

In an embodiment, when the first SMS 134 is sent to the mobile communication device 108, it may be considered as a signal that the service is ready for delivery to the user but may not necessarily indicate completion of the service. However, in some embodiments, the first SMS 134 can indicate that the service was initiated and completed as well successfully. In such situations, a separate SMS for service delivery may not be sent to the mobile communication device 108.

In embodiments, the service interface component (interchangeably referred to as service interface device without limitations) 130 sends the second short message service component (SMS) 136 to the service control system 110 upon activation of the trigger in the service setting. The second SMS 136 is indicative of the start of the service and is configured to be sent to the service control system 110 unlike the first SMS 134 which is sent to the mobile communication device 108 associated with the user 102 who seeks the service. In some embodiments, the first SMS 134 and the second SMS 136 can be sent at the same time from the service interface component 130. In an embodiment, the service provider 104 may control operation of the service interface component 130. In an embodiment, an external agency not related to the service provider 104 can control the service interface component 130 for independence, reliability, and trustworthiness.

In an embodiment, the first SMS 134 contains a first secured hash link that is executable by the mobile communication device 108 or the associated user 102. In an embodiment, the first secured hash link may be sent separately and not within the first SMS 134. In such cases, the service interface component 130 may generate a separate signal so that the signal may transmit the first secured hash link to the mobile communication device 108 for processing through any of the ways including through an SMS.

Executing the first secured hash link such as by clicking the first secured hash link may automatically record a first evidence of service delivery associated with the mobile communication device 108. The first evidence of service delivery (also referred to as service delivery evidence) can be recorded in a digital format as discussed hereafter in the document.

In an embodiment, the second SMS 136 contains a second secured hash link that is executable by the service control system 110 or an associated service delivery person or a user associated with the service control system 110. In an embodiment, the second secured hash link may be sent separately and not within the second SMS 136. In such cases, the service interface component 130 may generate a separate signal so that the signal may transmit the second secured hash link to the service control system 110 for processing through any of the ways including through an SMS.

Executing the second secured hash link by the service control system 110 or the associated user such as by clicking the second secured hash link may automatically record a second evidence of the service delivery associated with the service control system 110. The second evidence of service delivery (also referred to as service delivery evidence) can be recorded in a digital format.

Executing the second secured hash link by the service control system 110 can be performed in the way as explained above with respect to executing the first secured hash link by the mobile communication device 108 or the associated user 102.

In accordance with various embodiments, the first evidence of service delivery and the second evidence of service delivery can be one or more of an event, a digitally executable location input, a digitally executable voice input, and a digitally executable picture (digital image).

The service interface device 130 further sends a confirmation message in an electronic format along with a unique service proof token (SPT) to the mobile communication device 108 and the service control system 110 upon completion of the service delivery. In an embodiment, completion can be defined based on executing of the first secured hash link and the second secured hash link. However, in an embodiment, if the first secured hash link and the second secured hash link are defined for start of the service only and not necessarily for service completion, service delivery and its completion successfully may be determined based on another set of secured hash links that are sent through a third SMS to the mobile communication device 108 and a fourth SMS to the service control system 110. The third SMS may contain or be separately associated with a third secured hash link. Similarly, the fourth SMS may contain or be separately associated with a fourth secured hash link. In such cases, end of the service and its successful completion may be determined when the third secured hash link and the fourth secured hash link are executed by the mobile communication device 108 and the service control system 110 respectively or by respective users.

When the first secured hash link and the second secured hash link and/or the third secured hash link and the fourth secured hash link (if end of service is separately defined) are respectively executed by the mobile communication device 108 and the service control system 110, the service interface device 130 considers delivery of the service to the user 102 associated with the mobile communication device 108 as complete. The service interface device 130 may generate a unique service proof token (SPT) executable through digital modes and send it to the mobile communication device 108. This STP may be associated with the mobile communication device 108 and is unique to the mobile communication device 108 for the specific transaction and service delivery. If the same user 102 associated with the same mobile communication device 108 arrives again in the service setting for a new service request, a new unique service proof token may be generated.

The service interface device 130 may generate a second unique service proof token (SPT) executable through digital modes and send it to the service control system 110. This STP may be associated with the service control system 110 and is unique to the service control system 110 for the specific transaction and the service delivery. Both the STP associated with the mobile communication device 108 and the service control system 110 are together indicative of completion and delivery of the service by the service control system 110 to the user 102 associated with the mobile communication device 108 in the service setting.

As discussed above, in an embodiment, two SPTs are generated—one associated with the mobile communication device 108 and the other associated with the service control system 110. These SPTs signify the completion of the service.

In some embodiments, four SPTs may be generated as follows:

A first STP (SPT1) is generated that is associated with the mobile communication device 108 and represents start of the service. The SPT1 may be referred to as start of service proof token and signifies start of receipt of the service by the user 102 associated with the mobile communication device 108 from the service delivery entity or the second entity 104. The SPT1 is sent to the mobile communication device 108.

A second SPT (SPT2) is generated that is associated with the mobile communication device 108 and represents end of the service. The SPT2 may be referred to as end of service proof token and signifies end and successful delivery of the service to the user 102 associated with the mobile communication device 108 by the service delivery entity 104. The SPT2 is sent to the mobile communication device 108.

A third SPT (SPT3) is generated that is associated with the service control system 110 and represents start of the service. The SPT3 may be referred to as the start of service proof token and signifies start of the delivery of the service to the user 102 associated with the mobile communication device 108 by the service delivery entity 104. The SPT3 is sent to the service control system 110.

A fourth SPT (SPT4) is generated that is associated with the service control system 110 and represents end of the service. The SPT4 may be referred to as end of service proof token and signifies end and successful delivery of the service to the user 102 associated with the mobile communication device 108 by the service delivery entity 104. The SPT4 is sent to the service control system 110.

In some embodiments, as discussed above, only two SPTs are generated and sent to the mobile communication device 108 and the service control system 110 representing complete delivery and end of the service to the user 102 associated with the mobile communication device 108 by the service control system 110 associated with the service delivery entity 104. All SPTs are digitally executable.

The system further includes a blockchain device 138 configured to automatically store computer executable instructions such as the digitally executable SPT associated with the mobile communication device 108 and the service control system 110. For example, the blockchain device 138 may store the SPT1, SPT2, SPT3, and SPT4. In embodiments where only two SPTs are generated representing end of the service, the blockchain device 138 may store the two SPTs.

In embodiments, the four SPTs—SPT1, SPT2, SPT3, and SPT4 may represent the evidences of the service delivery along with the status of the service delivery such as service start or service ending.

In an embodiment, where only the two SPTs are generated, for example, when the first secured hash link is activated by the user associated with the mobile communication device 108, the first evidence of the service delivery may be recorded within an SPT. The first evidence of the service delivery may indicate completion of the service and is associated with the mobile communication device 108 that is the first SPT is sent to the mobile communication device 108. Similarly, another SPT (such as the SP4 discussed above) may be sent to the service control system 110 which may contain the second evidence of the service delivery, which is indicative of the service completely delivered to the user 102 by the service control system 110. The SPTs (such as second SPT and the fourth SPT) sent to the mobile communication device 108 and the service control system 110 respectively are sufficient to prove whether the services have been delivered entirely by the service control system 110 to the user 102 associated with the mobile communication device 108 or not. Therefore, by retrieving the SPTs from the blockchain device 138, delivery of the services can be proven.

In an embodiment, where the four SPTs are generated, for example, when the first secured hash link is activated by the user 102 associated with the mobile communication device 108, a first evidence of the service delivery may be recorded within an SPT. The first evidence of the service delivery may indicate the start of the service and is associated with the mobile communication device 108 that is the first SPT is sent to the mobile communication device 108.

A second evidence of the service delivery may be recorded within another SPT when the second secured hash link is activated by the user 102 associated with the mobile communication device 108. The second evidence of the service delivery may indicate the end of the service and is associated with the mobile communication device 108 that is the SPT is sent to the mobile communication device 108 after the service is complete.

A third evidence of the service delivery may be recorded within an SPT such as the SPT3 discussed above when the third secured hash link is activated by the user 102 associated with the service control system 110. The third evidence of the service delivery may indicate the start of the service and is associated with the service control system 110 that is the third SPT is sent to the service control system 110 after the service starts.

A fourth evidence of the service delivery may be recorded within an SPT such as the SPT4 discussed above when the fourth secured hash link is activated by the user 102 associated with the service control system 110. The fourth evidence of the service delivery may indicate the end of the service and is associated with the service control system 110 that is the fourth SPT is sent to the service control system 110 after the service is complete.

In an embodiment with four SPTs, the four SPTs may be sufficient to prove when the services started and whether the services are delivered entirely by the service control system 110 to the user 102 associated with the mobile communication device 108 or not. Therefore, by retrieving these four SPTs from the blockchain device 138, initiation and delivery of the services can be proven.

The blockchain device 138 further stores location coordinates of the service control system 110 along with time stamped computer executable information associated with receipt of the location coordinates of the service control system 110. The time stamped computer executable information signifies digital representation of a time parameter that indicate the time when the location coordinates of the service control system 110 were received by the blockchain device 138. In embodiments, the time stamped information may indicate when the actual service was initiated for delivery by the service control system 110 and when the service was completely delivered to the user 102 associated with the mobile communication device 108.

The system 126 further includes a central verification device 140 to verify the first evidence of the service delivery and the second evidence of the service delivery (discussed above) by retrieving the unique respective STPs from the blockchain device 138 upon request from an external system. In case the four STPs are generated in accordance with some embodiments as discussed above, the central verification device 140 may verify one or more of the first evidence of the service delivery, second evidence of the service delivery, third evidence of the service delivery, and the fourth evidence of the service delivery by retrieving the unique SPTs (such as the first SPT, second SPT, third SPT, and the fourth SPT) from the blockchain device 138 upon request from an external system. The external system can be a computer-based system or control system associated with an external party such as the third entity 106 discussed above to automatically interact with the central verification device 140 for verifying the evidences of the service delivery by the service control system 110 to the user 102 associated with the mobile communication device 108. The verification by the central verification device 140 may help determine whether one or more of the services were performed in the service setting or not.

Figure 2:
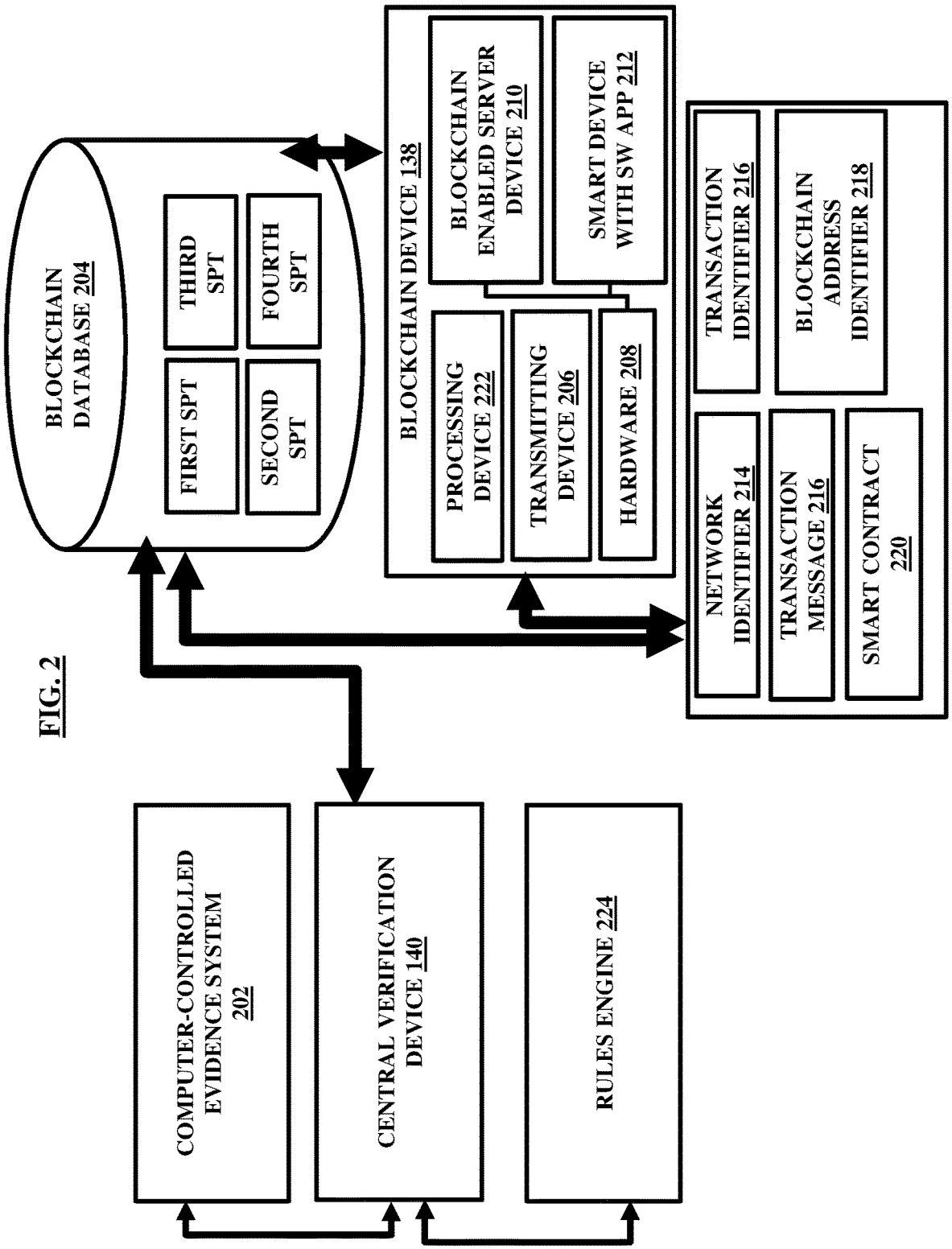
FIG. 2 illustrates a computer-controlled evidence system among other components according to an embodiment herein.

FIG. 2 illustrates a computer controlled evidence system 202 for recording the evidences of the service delivery connected to the central verification device 140 and other components as shown.

The computer controlled evidence system 202 may include combined mechanisms, software, and hardware components for facilitating recording of the evidences so that they are stored in a blockchain database 204 of the blockchain device 138. The evidences of the service delivery as recorded by the computer-controlled evidence system 202 are eventually converted into digital signals and tokens that may be stored along with the SPTs such as the first SPT (SPT1), second SPT (SPT2), third SPT (SPT3), and the fourth SPT (SPT4).

Figure 3:
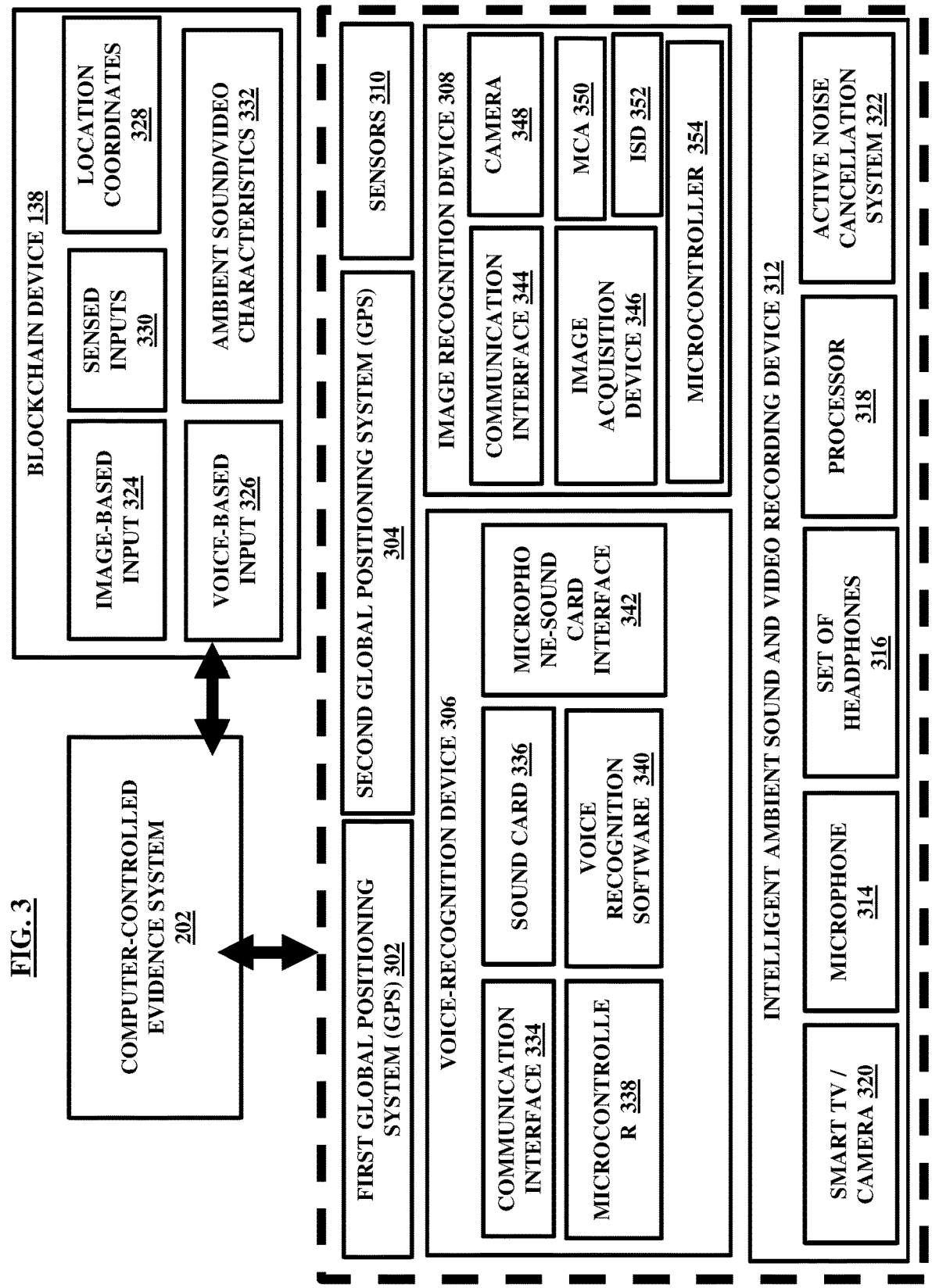
FIG. 3 illustrates a computer-controlled evidence system among other components according to an embodiment herein.

As shown in FIG. 3, the computer controlled evidence system 202 may include one or more of a first global positioning system (GPS1) 302, a second global positioning system (GPS2) 304, a voice recognition device 306, an image recognition device 308, and one or sensors connected in the service setting.

The computer-controlled evidence system 202 is discussed herein in conjunction with FIGS. 1 through 3.

In accordance with various embodiments, the first evidence of the service delivery and the second evidence of the service delivery can be one or more of an event, a digitally executable location input, a digitally executable voice input, and a digitally executable picture.

The one or more sensors 310 deployed in the service setting are configured to sense one or more environmental parameters including parameters indicative of triggering of the one more event. This may facilitate recording an evidence of the service delivery in the form of the one or more events (simply referred to as events interchangeably without limitations) occurring in the service setting by the one or more sensors (referred to as sensors interchangeably for the purpose of simplicity without limitations) 310. Each sensor of the sensors 310 may be defined to sense a particular parameter signifying an event. For example, the event may be an entry of a person sensed by a camera, occurrence of a public emergency sensed by a specific type of sensor, physiological changes sensed by a physiological sensor, weather events sensed by a weather sensor, and the like.

In some cases, the sensors 310 or other devices in the service setting may detect an event that may be dangerous or non-normal based on pre-programmed criteria or may detect unauthorized access by a mobile communication device not authorized to perform a specific action. In such situations, the sensors 310 or other devices such as the image recognition device 308, voice recognition device 310, intelligent ambient sound, and video recording device 312 and the like may generate an electric signal indicative of an unauthorized or non-normal request. The signal may be communicated to one or more of the computer-controlled evidence system 202, the blockchain device 138, the service control system 110, and the central verification device 140. The blockchain device 138 may record details of the non-normal request and the corresponding mobile communication device for future references so as it to be used for tracking a similar request by the same device in future and/or build rules to intelligently define patterns for governing automation of processing the requests in view of historical patterns. Additionally, such a request that is identified as non-normal may be rejected by the service control system 110 for fulfilling (e.g., fulfilling the request is denied).

The first GPS 302 is configured to sense location information of the mobile communication device 108 associated with the user 102. The second GPS 304 is configured to sense location information of the service control system 110. The first GPS 302 may be contained within the mobile communication device 108 of the user 102, in an embodiment. The second GPS 304 may be located in the service setting. For example, the second GPS 304 may be contained within the service control system 110 or may be deployed elsewhere in the proximity of the service control system 110 configured to sense location information of the service control system 110 and/or the service setting, which signifies place of the delivery of the service and hence a location-dependent evidence of the presence of the service control system 110 during delivery of the service to the user associated with the mobile communication device 108 which contains the first GPS 302.

The detection of location information of the mobile communication device 108 and the service control system 110 by the first GPS 302 and the second GPS 304 respectively that are individually controlled by respective owners (owner devices) may facilitate recording an evidence of the service delivery in the form of the location information or location coordinates which indicate the presence of the first entity (who receives the service) 102 and the second entity (who delivers the service) 104 at the same location during the delivery of the service in the service setting. Each GPS of the first GPS 302 and the second GPS 304 may be defined to sense the location coordinates of the respective entities 102 and 104 reliably that may not be modified.

The computer-controlled evidence system 202 may include the voice recognition device 306.

The voice recognition device 306 may be contained within or coupled to the computer-controlled evidence system 202. The identification and authorization of identity of the entities such as 102 and 104 and/or recording the evidence may be established based on voice patterns of the respective entities.

The voice recognition device 306 may include a communication interface 334 for establishing communication with other devices within the service setting over a communication network. The voice recognition device 306 may also include a sound card 336 which may be adapted to receive identity information of a respective entity 102 or 104. The identity information may be received in the form of a digital audio signal. The sound card 336 may be adapted to receive the digital audio signal and generate/transmit the audio signal to a microcontroller 338 for voice recognition based on pre-stored voice patterns. The sound card 336 may be adapted to sample an analog signal to generate the digital audio signal and interface with the microcontroller 338. The microcontroller 338, in association with voice recognition software 340, may be adapted to discriminate between multiple audio patterns and also compare the voice pattern of the entity with the pre-stored voice patterns to output a stream signal. The stream signal is indicative of verification of the identity information and used to record the evidence for the start and end of the service delivery. In an embodiment, the voice recognition device may include a microphone-sound card interface 342 for allowing interfacing between an external microphone with the sound card of the voice recognition device 306.

The computer-controlled evidence system 202 may include the image recognition device 308.

The image recognition device 308 may be coupled to or contained within the computer-controlled evidence system 202. The identification and authorization of the identity of the entities such as 102 and 104 and/or associated devices such as 108 and 110 may be established based on image patterns of the respective entities 102 and 104.

The image recognition device 308 may include a communication interface 344 for establishing communication with various devices within the service setting. The image recognition device 308 may include an image acquisition device 346 to receive signals containing image patterns and facial expressions. The image acquisition device 346 may include or be coupled to a camera 348 for taking still or streaming images. The image acquisition device 346 may include a plurality of multichannel amplifiers (MCA) 350 such that each amplifier of the multichannel amplifiers 350 may be defined to receive a specific type of sensed information from a particular type of sensor or camera 348 sourcing signals for the image recognition device 308. The amplified signals obtained from the plurality of multichannel amplifiers 350 may then be transmitted to an image segmentation device (ISD) 352 for fragmenting the received image patterns to identify micro level details such as micro facial expressions and the like. These federated image patterns may then be transmitted to a microcontroller 354 for further processing and verification of the identity of the entity such as 102 and 104. The identity information may be received in the form of a digital audio signal containing the received image patterns. The image acquisition device 346 may be adapted to receive the digital audio signal and generate/transmit the audio signal to the microcontroller 354 for image recognition based on pre-stored image patterns (including such as micro facial expressions). The image recognition device 308 may be adapted to sample an analog signal to generate the digital audio signal and interface with the microcontroller 354. The microcontroller 354, in association with necessary recognition software, may be adapted to discriminate between multiple image patterns and also compare the image pattern of the entity with the pre-stored image patterns to output a stream signal. The stream signal is indicative of verification of the identity information as obtained in the form of the image pattern.

In an embodiment, the computer-controlled evidence system 202 may include an intelligent ambient sound and video recording device 312 that may allow combining GPS information and sound and/or video recorded in the service setting together. If the sound or voice or video is recorded for two or more participants or entities and their respective GPS information indicate their presence in the same location or same service setting, this may be indicative of the service participants being present together and verifies with a stronger evidence than merely alone with a voice evidence or a video evidence or a GPS-based evidence. In such situations, the service proof tokens (SPTs) can be generated for both the medical device 108 and the service control system 110 or any other participants at the time of the start of the service and the end of service in accordance with embodiments as discussed elsewhere in the document.

The intelligent ambient sound and video recording device 312 may include a microphone 314 and a set of headphones 316. The microphone 314 monitors an ambient sound environment. The intelligent ambient sound and video recording device 312 may further include a processor 318 that receives an output from the microphone 314. The processor 318 compares the output to pre-stored sound characteristics within the ambient sound environment. The processor 318 may generate and send an output in the form of an audio notification to the set of headphones 316 when the sounds are identified and verified.

The intelligent ambient sound and video recording device 312 may include a smart TV or a camera 320 to record video and watch where the participants are moving.

The intelligent ambient sound and video recording device 312 may also include an active noise cancellation system 322 that generates a noise cancellation signal in response to an ambient noise. The noise cancellation signal may be transmitted to the processor 318 before analysis and matching of the recorded noise with the predefined characteristics.

In some cases, if one or more of the voice recognition device 306, image recognition device 308, and the intelligent ambient sound and video recording device 312 fails to detect the respective identity information in the form of a verified image, voice, sound characteristic etc of the entity 102 and/or the associated mobile communication device 108 and the like, an evidence respective to the transaction may not be recorded. In such an event, failure to recording of the evidence may not allow digitally recording details for start of the service or completion of the service or both. Even if the service is delivered in such cases, for verification and digital recording purposes, it may still be considered as a service that is not delivered or completed as no digital proof for the service exist.

The failure to recording of the evidence may be reported to one or more of the service control system 110, the respective mobile communication device 108, and the blockchain device 138, and the central verification device 140 by the one or more of the voice recognition device 306, image recognition device 308, and the intelligent ambient sound and video recording device 312. In some embodiments, the service control system 110 may utilize an alternative way of authorization and recording the evidence for future references, in such situations. The service control system 110 may first verify the identity of the user for authorization purposes and then request the user 102 upon identity authorization to submit a message indicative of confirmation of presence of the user 102 in the service setting during service delivery to the blockchain device 138 as an evidence of service completion or service start or both. The entity or the user 102 may send the message indicative of the confirmation of presence through the associated and registered mobile communication device 108 to ensure the evidence is acceptable to the blockchain device 138. A dedicated custom graphical interface may be provided to the user 102 through a web-based mechanism such that the interface may allow the user 102 to send the message indicative of the delivery of service as well as the service control system 110 participating in the delivery of service over the blockchain network.

The processor 318 of the intelligent ambient sound and video recording device 312 may receive the GPS information (discussed above) from the service control system 110 and the mobile communication device 108 and combine this with a processed output of the recorded sound and/or audio by the camera or smart TV 320 and/or the microphone 314 so as to generate a combined correlated evidence that is indicative of the participants such as 102 and 104 etc as being present at the same place during the delivery of the service. This way, not only the evidence in the form of respective locations is recorded but also identity of the participants is verified by matching the recorded sound and/or video characteristics with the pre-stored characteristics.

One or more of the evidences as recorded from the one or more devices contained within the computer-controlled evidence system 202 are automatically generated upon activation of the first secured hash link and the second secured hash link (and in some cases the third secured hash link and the fourth secured hash link) by the mobile communication device 108 and the service control system 110 respectively when the first SMS 134 and the second SMS 136 are sent by the service interface device 130 to the mobile communication device 108 and the service control system 110. As soon as the secured hash links are activated, the two SPTs (and in some cases the four SPTs) that generally contain the evidence information including one or more of the location information (location-based evidence), image information (image-based evidence), voice information (voice-based evidence), and the sensed information are generated. In embodiments, when the four SPTs are generated based on the activation of the four discrete SPTs—two for start of the service and two for end of the service, the four SPTs may contain the evidence information, such that during start of the service, the two SPTs contain a first set of evidence information that is indicative of the evidences during start of the service, the other two SPTs contain a second set of evidence information that is indicative of the evidences at the end of the service delivery. However, in some embodiments, even with cases of the four secured hash links being generated and the four SPTs being created, evidences of the service delivery may be recorded only for the two secured hash links that are associated with the end of the service delivery as the third party might be interested only in knowing about the evidences of successful delivery of the service and not the start of the service.

The SPTs generated accordingly and containing the evidence information are automatically stored with the blockchain device 138. The blockchain device 138 may contain specialized databases and data stores such as the blockchain database 204 to store the SPTs containing the evidence information among other information elements. The blockchain database 204 may be particularly tailored so that the SPTs stored therein are secured through blockchain technology and cannot be modified by any entity.

The blockchain device 204 may include a processing device 222 and a transmitting device 206 that each is capable of blockchain integration unlike generic devices. The processing device 222 may process all blockchain tasks through computer-controlled software and hardware tools. The transmitting device 206 can allow transmission of information such as the evidence information to the central verification device 140 and/or the third party 106 as needed. The transmitting device 206 may also enable all sorts of communication with other systems including the central verification device 140 and the computer-controlled evidence system 126.

The blockchain device 138 may store image-based input 324 received from the image recognition device 308, voice-based input 326 received from the microphone 314, location coordinates 328 received from the first GPS 302 and the second GPS 304, sensed inputs 330 from the sensors 310, ambient sound/video characteristics 332 received from the intelligent sound and video recording device 312.

The blockchain device 138 also includes hardware 208. The hardware 208 may comprise a specific blockchain-enabled server device 210 and a smart device running a specific dedicated software application 212 operated by a user. The smart device 212 is configured to engage in specific communication with the blockchain-enabled server device 210. The blockchain-enabled server device 210 performs tasks enabling communication with the smart device 212. The blockchain-enabled server device 210 further performs at least one of these tasks: storage of at least one data base or a portion thereof and/or data for placement therein in the blockchain database 204, access the at least one data base including the blockchain database 204, update the at least one database including the blockchain database 204, allow the smart device 212 to access and receive information in whole or in part from the at least one database. In some embodiments, the at least one data base such as the blockchain database 204 may contain at least one unique hash, at least one timestamp of the at least one unique hash, and/or other data for generating smart contracts.

The transmitting device 206 may allow transmission of at least one hash file and/or hash blockchain to the blockchain-enabled server 210. The transmitting device 206 may further allow receiving a transaction confirmation and/or identifier from the smart device 212, creating a hash file and/or hash blockchain from the digital data and/or digital content, receiving the hash file and/or hash blockchain and the timestamp from the smart device 212. The processing device 222 may compare the hash file and/or hash blockchain to other verification information for verifying authenticity of a variety of information.

The processing device 222 may generate a network identifier 214, a transaction identifier 216, and a blockchain address identifier 218 to specify a particular transaction that involves a delivery of service associated with the two or the four SPTs as discussed above. Each such set of identifiers define a specific transaction indicated through a smart contract 220 and cannot be tempered. The smart contract 220 allows tracing the evidences of the service delivery for any particular delivery of the service in the service setting. In an embodiment, the processing device 222 is configured to cause the smart contract 220 to be generated based on the network identifier 214, transaction identifier 216, and the blockchain address identifier 218 such that the smart contract 220 is configured to automatically validate a transaction using a special key associated with a user or a transaction.

A transaction message 216 may be generated by the processing device 222 to inform respective entities. In an embodiment, the transaction message 216 may be associated with one or more secured hash links so that the transaction message 216 is generated when the one or more secured hash links are activated and the respective SPTs are stored in the blockchain database 204.

The processing device 222 may generate the network identifier 214 that may be associated with a blockchain network and the transaction ID (identifier) 216. The processing device 222 may generate the blockchain address identifier 218 using at least a unique key included in a transaction request and one or more hashing codes including the SPT associated with the respective mobile communication device 108 and the service control system 110.

In an embodiment, the blockchain address identifier 218 may be based on a public key corresponding to a private key that was used to register the transaction on the blockchain such that the public key and the private key are part of a public/private key pair associated with the transaction indicative of the delivery of the service in the service setting.

In an embodiment, the processing device 222 may generate the transaction message 216 based on one or more standards and includes a plurality of data elements, including at least a first data element configured to store a proof of transaction as the evidence reserved for private use upon request for verification by the central verification device 140. The use of evidence privately is indicative of a controlled and secured access of the evidence only to authorized entities.

The transmitting device 206 may be configured to transmit the transaction message 216 to the mobile communication device 108 and the service control system 110 for private use.

In an embodiment, the central verification device 140 may allow comparing the evidence information as stored in the blockchain database 204 with external information to verify whether the services were actually delivered by the service control system 110 to the user 102 associated with the mobile communication device 108 at a particular time within the service setting. The central verification device 140 retrieves the first SPT, the second SPT, the third SPT, and the fourth SPT for verification of the evidence of the service delivery.

The central verification device 140 includes or is coupled to a rules engine 224 that defines and facilitates processing of a set of computer executable rules defining instructions for verification of the evidence information. The computer executable rules may allow verifying proof of evidences based on the occurrence of the event, receipt of the digitally executable location information, receipt of the digitally executable voice input, or receipt of the digitally executable image input etc through the one or more SPTs that eventually get stored in the blockchain database 204.

The rules engine 224 may include or be coupled to a memory circuit, a processing circuit, integrated circuits, chipsets, and rules translators (not shown in the FIG.).

Based on a digital output generated by the central verification device 140 indicative of the verification of the evidence of the delivery, the central verification device 140 processes or rejects a claim requested by the third entity 106 in accordance with the set of computer executable rules.

If the evidence of the delivery is verified to be true by the central verification device 140, the claim is processed digitally in favor of a user requesting the claim through a digitally communicated request. However, if the evidence is rejected due to lack of reliability or failure to an availability of the evidence at all or due to any other reason, the claim is not processed and the central verification device 140 informs the user 102 accordingly. The user 102 may still counter a decision to reject the claim by the central verification device 106 if the rejection is not on accurate grounds. In such a case, the user 102 may choose other options such as to manually report the evidence of the service delivery to a concerned authority for making necessary corrections or take a legal route for prosecuting the matter if it does not agree with the decision.

The rules engine 224 includes at least one rule that identifies an external entity such as 104 that pays for a service and verification information requested by the external entity as proof that a particular service was performed through a digitally stored SPT associated with the user 102 of the mobile communication device 108.

Figure 4:
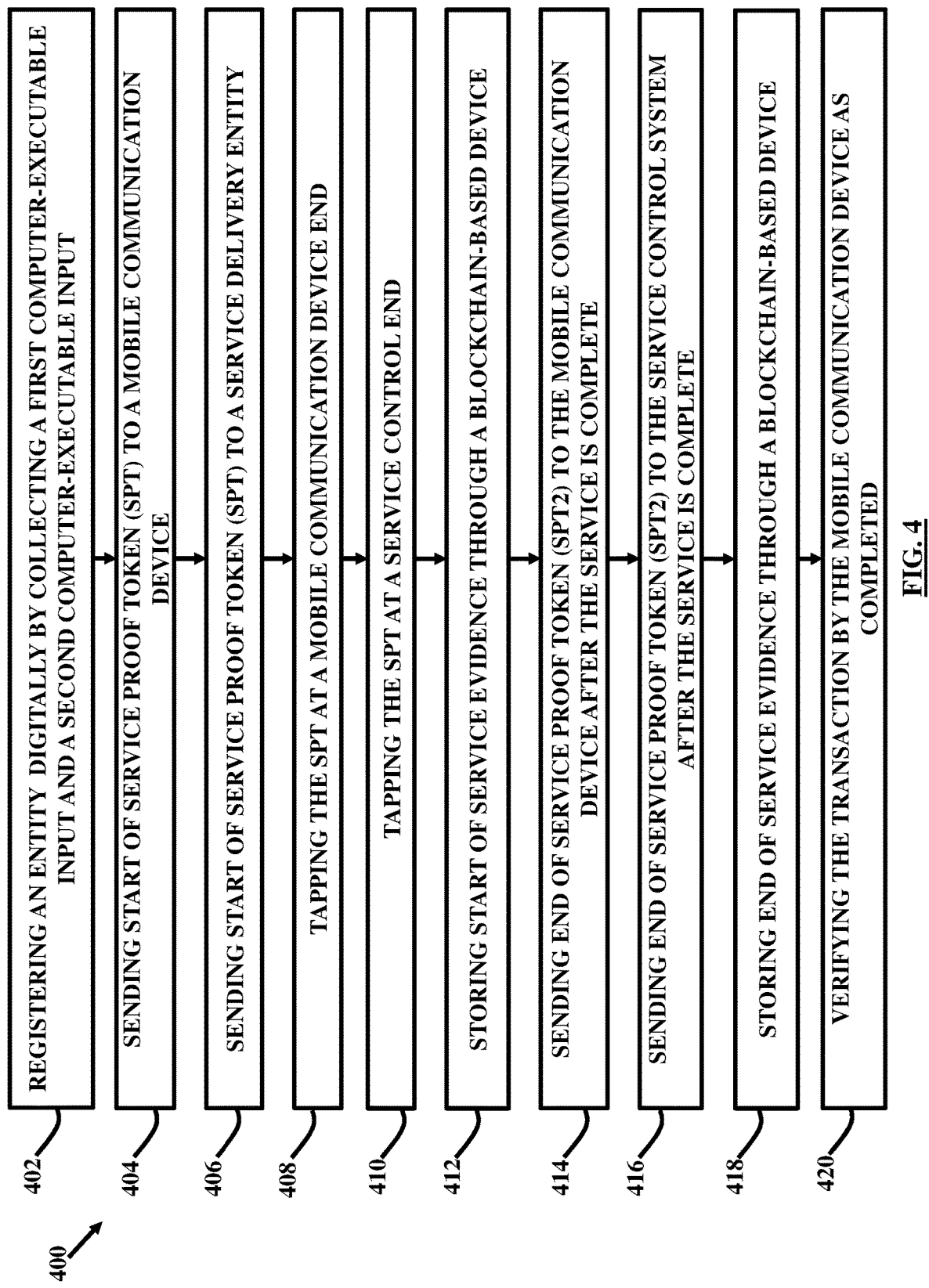
FIG. 4 illustrates a flowchart depicting a method for recording of evidence digitally in a computer-executable format with the use of a computer-controlled system according to an embodiment herein.

FIG. 4 illustrates a flowchart 400 depicting a method for allowing recording of the evidences digitally in a computer-executable format with the use of the computer-controlled system 126 for the service delivery within the service setting.

At step 402, the method includes registering an entity such as the entity 102 digitally by collecting a first computer executable input and a second computer executable input. The first computer executable input and the second computer executable input may be similar to the first computer executable input and the second computer executable input in conjunction with FIG. 1.

At step 404, the method includes sending the start of the service proof token (SPT) to the mobile communication device 108. At step 406, the method includes sending the start of the service proof token (SPT) to the service delivery entity such as 104. At step 408, the method includes tapping the SPT at a mobile communication device end. At step 410, the method includes tapping the SPT at a service control end. At step 412, the method includes storing the start of the service evidence through the blockchain-based device or blockchain device 138. At step 414, the method includes sending the end of the service proof token to the mobile communication device 108 after the service is complete. At step 416, the method includes sending the end of service proof token to the service control system 110 after the service is complete. At step 418, the method includes storing the end of the service evidence through the blockchain-based device 138. At step 420, the user 102 and/or the associated mobile communication device 108 may be allowed to verify the transaction through a custom defined web-based or offline user-interface such that the verification of the transaction by the user 102 is indicative of the user 102 agreeing to the service as completely delivered by the service control system 110. The verification may be recorded in the form of an input that may be received by the service control system 110 as well as the blockchain device 138 from the user 102 or the associated mobile communication device 108.

Figure 5:
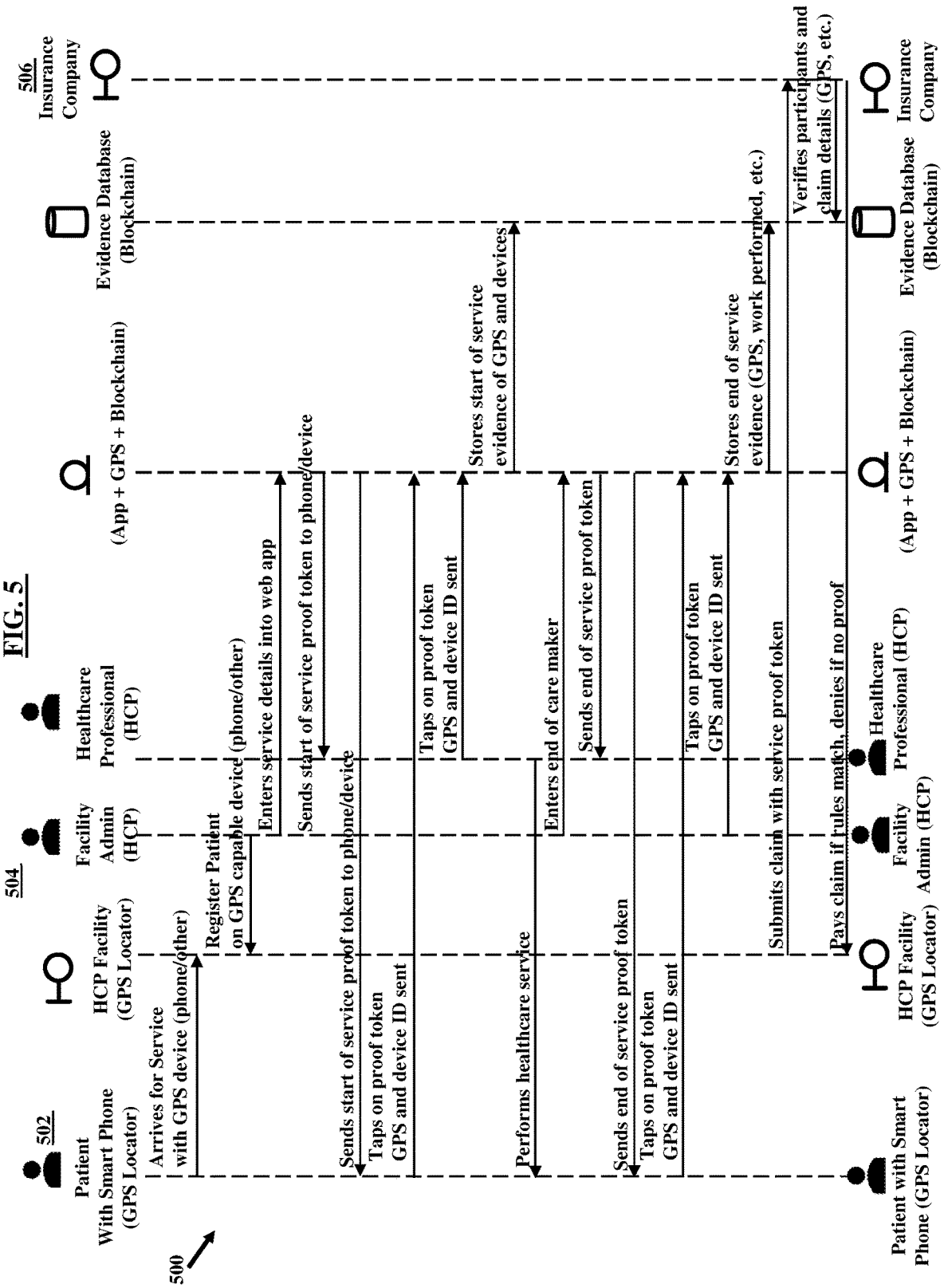
FIG. 5 illustrates a use case of service delivery according to an embodiment herein.

The method of FIG. 4 is further discussed in conjunction with flow diagram 500 illustrated in FIG. 5. Referring now to FIGS. 1 through 5, automated recording of the evidences of the service delivery within the service setting is discussed.

FIG. 5 illustrates a particular use case as an example and other use cases and embodiments herein may also be possible, without limitations. A first entity denoted by a patient 502 in the figure arrives in a service setting for a service. The patient owns a mobile communication device such as the mobile communication device 108 or any other device capable of locating geo-locations. For example, the mobile communication device 108 includes a GPS similar to the GPS 302 discussed above. The service setting may be a healthcare provider facility (HCP) 504. The HCP 504 may also be GPS-enabled and may include a GPS device similar to the GPS device 304 discussed above for the service setting or the service control system 110. The HCP 504 registers the mobile communication device 108 or the associated patient 502 on a GPS-capable device such as the service control system 110 discussed above. The HCP 504 enters service details and end of care information into a web-based system such as the web-based interaction component 128 to collect information about the mobile communication device 108 and the associated patient 502 as appropriate.

When the registration of the patient 502 is complete, the service interface device 130 sends a unique start of the service proof token to the mobile communication device 108. The service interface device 130 also sends a unique start of the service proof token to the service control system 110 at the HCP 504. The service control system 110 or an associated user taps on the unique service proof token delivered to the HCP 504. Similarly, the mobile communication device 108 or the associated patient 502 taps on the unique service proof token delivered to the mobile communication device 108. With the tapping of the respective service proof tokens, GPS (location) information and device information of the mobile communication device 108 and the service control system 110 are sent to the service interface device 130. The GPS (location) information and the device information of the mobile communication device 108 and the service control system 110 are stored in the blockchain-based evidence database (or simply the blockchain database) 204 as an evidence for later use. This is referred to as start of the service evidence.

When the service is complete and successfully delivered to the patient 502, the service interface device sends a unique end of the service proof token to the mobile communication device 108. The service interface device 130 also sends a unique end of the service proof token to the service control system 110 at the HCP. The service control system 110 or the associated user taps on the unique end of the service proof token delivered to the HCP 504. Similarly, the mobile communication device 108 or the associated patient 502 taps on the unique end of the service proof token delivered to the mobile communication device 108. With the tapping of the respective end of the service proof tokens, the GPS (location) information and the device information of the mobile communication device 108 and the service control system 110 are sent to the service interface device 130. The GPS (location) information and the device information of the mobile communication device 108 and the service control system 110 at the time of the end of the service are also stored in the blockchain-based evidence database such as the blockchain database 204 as an evidence for later use. This is referred to as end of the service evidence.

A third party such as the third entity 506 (as an example, insurance company in the illustrated user case) may verify participants including the patient 502 and the HCP 504 when a claim is submitted along with the start of the service evidence and the end of the service evidence (along with respective service proof tokens) by one or more of the patient 502 and the HCP 504. If the patients 502 and HCP 504 are verified in accordance with defined rules (when the defined rules match), the insurance company (i.e., third entity 506) may pay claims or else may deny if no evidence is available or if the patients 502 and/or HCP 504 (i.e., participants) are not verified. If the non-availability of the evidence is due to some technical fault or not on proper/fair grounds, the HCP 504 or the patient 502 may have an option to refute the decision or request for reconsideration or take a legal route in an event of no resolution.

The patient 502, HCP 504, and third entity 506 may behave in a manner similar to the participants or entities 102, 104, and 106 respectively elsewhere in the document. After the identity of the patient 502 and/or the HCP 504 and the evidence are verified, the claim may be processed. The patient 502 and the HCP 504 and or the associated devices may be redirected to a custom interface for confirming receipt of the claim and verification of the identity. For example, the associated devices may receive a message requesting to open a screen that is presented on display units of the respective device such that the screen may show options to confirm receipt of the claim when it is received. This completes a transaction indicative of receipt of the claim. The information is then conveyed to the blockchain device 138 for recording in the database 204.

Figure 6:
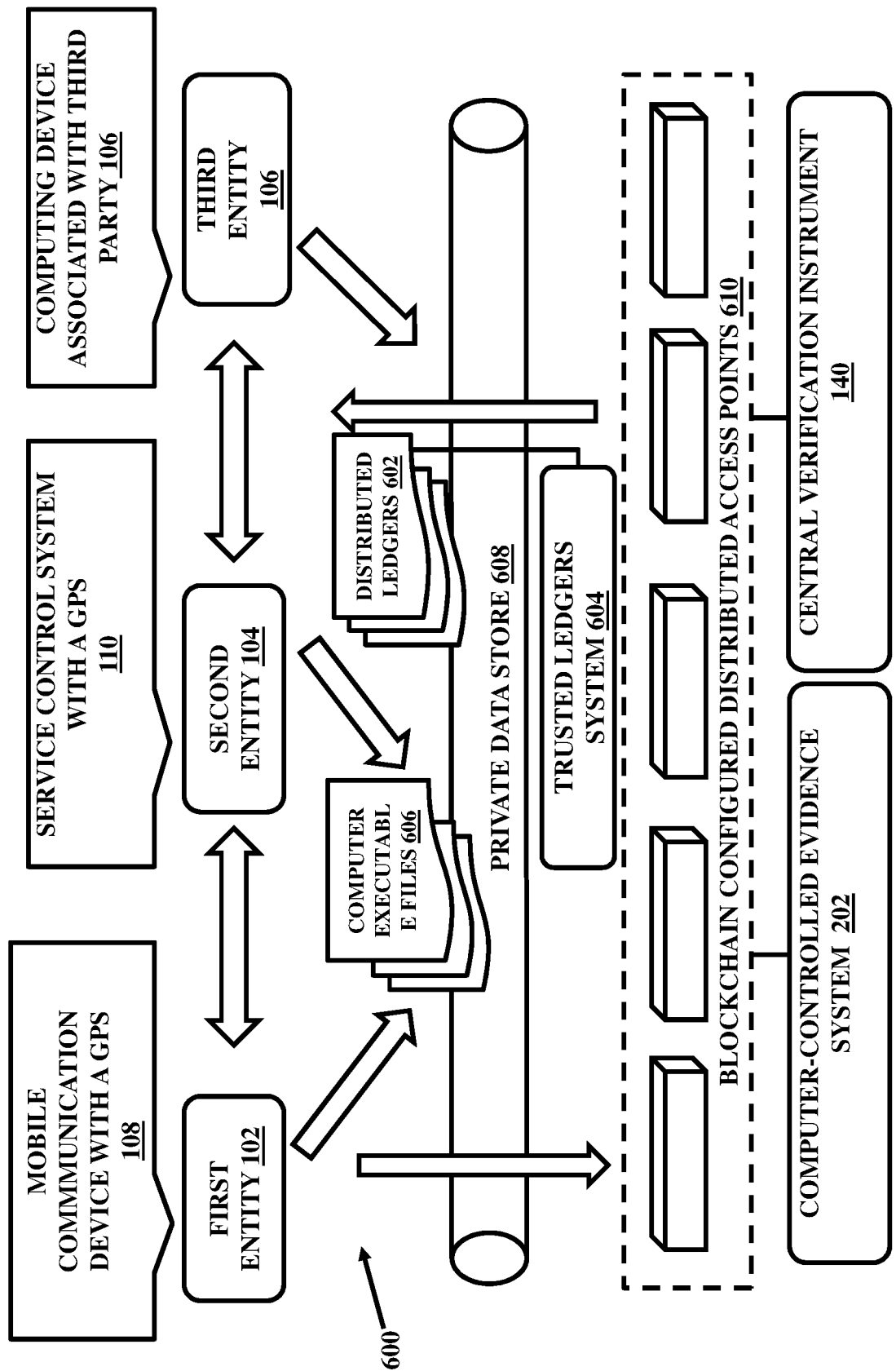
FIG. 6 illustrates blockchain computer architecture of the system of FIG. 1 along with other systems in accordance with an embodiment herein.

FIG. 6 illustrates a blockchain computer architecture of the system 126 of FIG. 1 along with other systems and components in accordance with an embodiment herein. FIG. 6, with reference to FIGS. 1 through 5, illustrates an exemplary blockchain configured ecosystem architecture 600 containing one or more components of the system 126 as discussed in conjunction with FIG. 1 and also contain additional components so as to allow integrity of submission of the evidences of the service delivery and the service proof tokens as discussed above in the document. This may facilitate association of an identity to the evidences thus submitted and also define and store a geographical and temporal identity such as when and in which location presence of the participants such as the first entity 102 and the second entity 102 and their respective devices such as mobile communication device 108 and the service control system 110 are noted. The blockchain configured ecosystem architecture 600 may provide a crowdsourced integrity network for storing the evidences instead of locally stored information by different participants that may be tempered.

The ecosystem architecture 600 may be blockchain configured involving various blockchain devices. For example, the computer-controlled evidence system 202 and the central verification device 140 that interact with the blockchain device 138 may be blockchain configured. A network that facilitates interaction across all components may be a blockchain integrity network. The blockchain network may build trust among the various participants or entities and their associated computing terminals or devices even if the devices/terminals etc may not know one another. The blockchain network may allow connections and transactions and recording and sharing of the evidences and the service proof tokens in a trusted mode. A record of transactions and sharing and data from various terminals/devices stored on the blockchain in the form of computer executable distributed ledgers 602 may provide proof to command the necessary trust among the terminals/devices (such as those associated with various participants including the mobile communication device 108, service control system 110, central verification device 140, third party devices etc) to cooperate through a peer-to-peer or peer-to-client distributed digital ledger technology. The ecosystem architecture 600 may include a distributed trusted ledgers system 604 containing the distributed blockchain ledgers 602 associated with a plurality of computing terminals and devices such that each ledger stores a copy of computer executable files 606 containing the evidences for the service delivery and the service proof tokens and the trust notes for defining security and trust among the computing terminals and devices across the network so that each computing terminal trusts the other computing terminal through the blockchain. The distributed ledgers system 604 enables coding of rules-based contracts that execute when specified conditions are met. The distributed ledgers 602 make it easier to create cost-efficient networks where any device or any evidence associated with a service delivery may be tracked, without requiring a central point of control.

The various computing terminals or devices in the network serve as distributed peer-to-peer nodes and connections. The central verification device 140 may serve as a client device configured to perform the task of validating and verifying the evidences based on the rules as defined. Each terminal/device/node in the ecosystem architecture 600, etc. may get a copy of the blockchain which may get downloaded automatically upon joining the blockchain integrity network. Every node or the device in the network is an administrator of the blockchain, and may join the network voluntarily so that the network is decentralized.

The blockchain may eliminate the risks that come with data being held centrally by storing data across the network which may include the computer executable files 606 containing the evidences and the service proof tokens. The blockchain security use encryption technology and validation mechanisms for security and integrity verification. The security may be enabled through public and private keys. A public key may define a user's address on the blockchain. The private key may give its owner an access to various digital assets in the network.

In an embodiment, the distributed ledgers 602 may enable coding of the smart contracts 220 that will execute when specified conditions are met. These smart contracts 220 may protect the evidences associated with the service deliveries and eliminate the risk of files copying and redistribution without protecting privacy rights.

The blockchain configured ecosystem architecture 600 may provide a private view for the various devices and the entities operating in the network through a private data store 608 so that each such device may privately access the computer executable files 606 containing the evidences and the service proof token or other details associated with a service delivery entity 104 based on various policies such as based on their respective identities. Each of the devices may access the computer executable files 606 through the dedicated private store 608 available through the plurality of distributed blockchain configured access points 610 which may be enabled in the form of distributed blocks as shown in FIG. 6, with each block providing a facility to access the features of the blockchain configured ecosystem architecture 600 by different terminals and devices at the same time based on defined and granted access rights.

The private data store 608 may provide a virtual storage to facilitate interaction, information exchange, reviewing, and presentation of the computer executable files 606. For example, the private data store 608 may allow a virtual storage and presentation of only limited executable files or portions of the executable files for access by particular nodes in accordance with permissions granted for reviewing. The private data store 608 may be configured to auto-hash review interactions at any required interval. This compartmentalization of the computer executable files 606 ensures that the computer executable files 606 are secured and private as per access rights authorized to the nodes. The data presented on the private data store 608 of the blockchain serves as a secure way to ensure that the private data store 608 is in sync with any permissioned access.

In embodiment, the mobile communication device 108, the service control system 110, and the central verification device 140 may be allowed to access discrete portions of data elements including the computer executable instructions stored within the blockchain device based on access rights through respective blockchain access points such that an access to the data elements allows one or more of viewing, locally replicating, and digitally sharing the data elements at least in part.

In an embodiment, the blockchain configured digital ecosystem architecture 600 may provide a federated blockchain comprising of several entities/participants such as 102 and 104 etc and their associated computers and devices and sensors that jointly interact to process transfers of data through a trusted, secured and distributed network of the blockchain configured access points 610. For example, authorized parties may access the evidences and respective SPTs for evaluation and verifying of the evidences before processing a transaction such as a claim that requires availability of evidences for verification purposes. The user 102 associated with the mobile communication device 108 may access a respective private data store 608 through a respective access point 610 to view corresponding transactions and evidences and may also take a local digital export on a local storage device for its future references. However, none of the participants are allowed to modify these details in the blockchain so as to ensure integrity of the information and the network. The participants however can be allowed to update their respective identity information such as update their contact details, personal details etc, a record of which may also be stored in the blockchain to track historical changes and identity information.

In accordance with various embodiments, different mechanisms may be employed for the computer-controlled evidence system 202 to record the evidences and store them into the blockchain device 138. For example, in an embodiment, two-fold system may be employed such that the two-fold system may include a call- or SMS-based system as discussed above, wherein the SMS is sent or a call is made to the mobile communication device 108 and the service control system 110 for enabling initiation of the start of the service tokens and the end of the service tokens. The two-fold system may also include a voice-based recognition system such as involving the voice recognition device 306 as shown in FIG. 3. The voice recognition device 306 may operate based on pre-known and pre-defined voice samples of users such as the second entity and the first entity. The voice samples can be matched with real-time voice data to verify the presence of one or more participants 102 and 104 within the service setting at the time of the service delivery. In some embodiments, real-time IVR options may be provided to verify and match with the pre-defined voice samples. Other smart devices such as smart speakers or ambient video recording or ambient sound recording devices may be employed within the service setting to allow recording of the evidences during the service delivery and generating the one or more of the start of the service proof tokens and the end of the service proof tokens for storage on the blockchain. One such smart device may be a smart TV that watches where the participants 102 and 104 (or patient 502 and HCP 504) are going and accordingly triggers generating the start of the service proof tokens and the end of the service proof tokens for storage on the blockchain.

In accordance with various embodiments, the service setting may be defined based on various parameters. For examples, the service setting may be defined by a particular geo-location such as through latitude and longitude values. In an embodiment, the service setting may be defined through geo-fencing. Geo-fencing (geofencing) may allow a software program and associated hardware to use a global positioning system (GPS) or radio frequency identification (RFID) device to define geographical boundaries that may be indicative of the service setting.

Geo-fencing may allow an administrator to set up triggers including the trigger discussed above so that when a device such as the mobile communication device 108 enters (or exits) the boundaries defined by the administrator through geo-fencing, an alert may be generated or the trigger may be generated.

In an embodiment, the service setting may be defined based on either of the first entity 102 and the second entity 104 to be proximate to the other entity. The proximity may be associated by pre-defined location coordinates or geographical barriers or distance values. For example, if an entity enters within a radius of 30 meters of the other entity, the two entities 102 and 104 may be considered proximate enough to be considered within the service setting at the same time. The geographical boundary in this case may be a 30 meter radius, as an example. The service setting in this case may be identified by either of the entities 102 and 104 to enter within the geographical boundary. For example, if the entity 102 moves proximate to the entity 104, the service setting may be defined. Similarly, if the entity 104 moves proximate to the entity 102, the service setting may still be defined as long as both the entities 102 and 104 are within the geographical boundary in accordance with the pre-defined location coordinates or the geographical barriers or the distance values.

In an example, the embodiments herein can provide a computer program product configured to include a pre-configured set of instructions, which when performed, can result in actions as stated in conjunction with the method 400 or 500 described above. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

Embodiments herein may also include tangible and/or non-transitory computer-readable storage media for carrying or having computer executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network 104 or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network 104 environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network 104). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network 104 adapters may also be coupled to the system to enable the data processing system to become coupled to other data processing systems or remote printers or storage devices through intervening private or public network 104*s*. Modems, cable modem and Ethernet cards are just a few of the currently available types of network 104 adapters.

Figure 7:
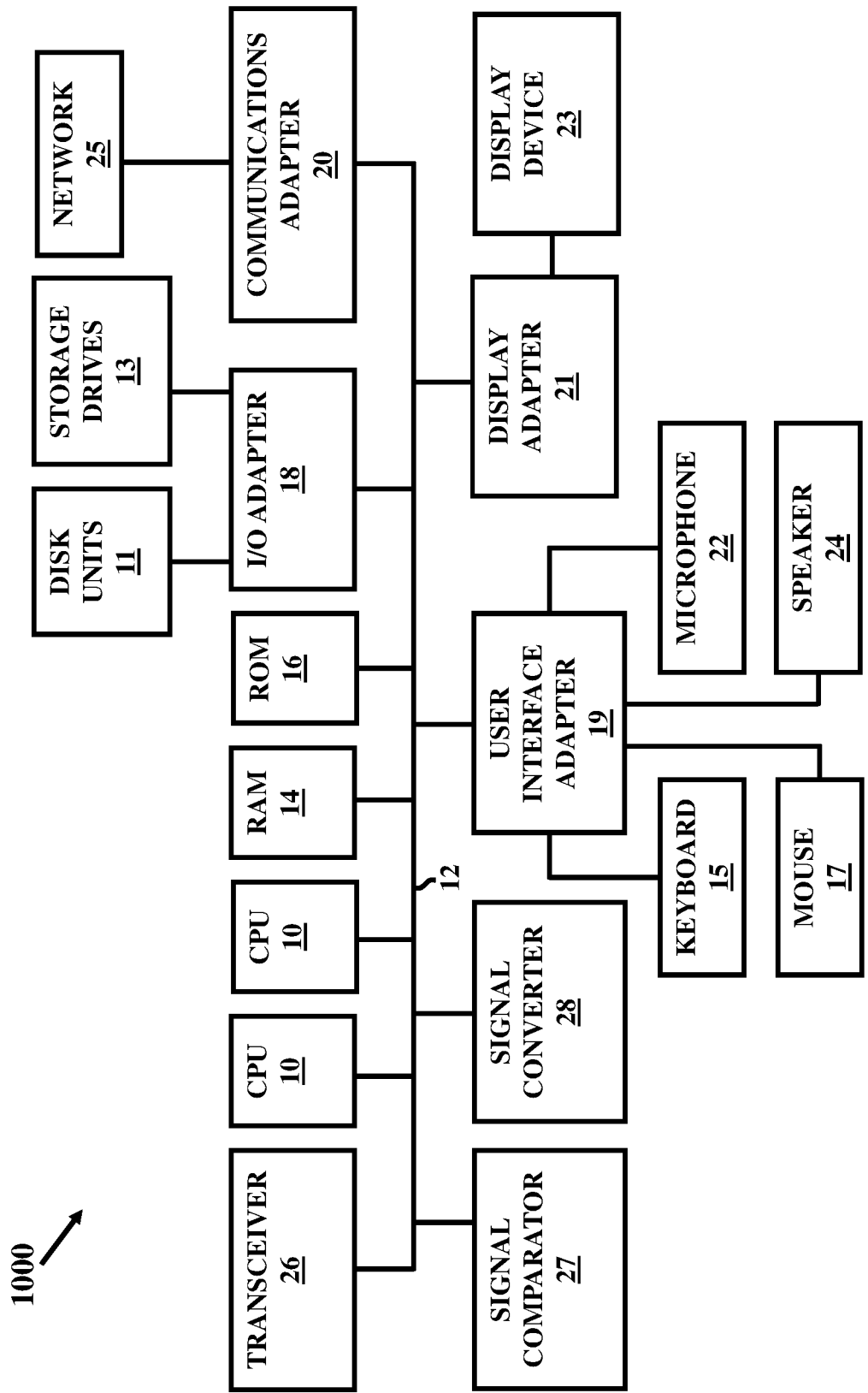
FIG. 7 is a block diagram illustrating a computer system according to an embodiment herein.

A representative hardware environment for practicing the embodiments herein is depicted in FIG. 7. This schematic drawing illustrates a hardware configuration of an information handling/computer system 1000 in accordance with the embodiments herein. The system 1000 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 1000 can read the inventive instructions on the program storage devices and follow these instructions to execute the methodology of the embodiments herein. The system 1000 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 1025, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer-controlled system for automated recording of evidence of a delivery of a service in a service setting, said system comprising:
- a mobile communication device associated with a user in a service network, wherein said mobile communication device comprises predefined information about said mobile communication device and said user;
- a service provider-associated computer system that manages and processes delivery of services in said service setting by a service provider;
- an electronic device that transmits:
  - a first short message service (SMS) signal to the mobile communication device and comprising a first secured hash link that is clicked to record a first evidence of service delivery associated with the mobile communication device; and
  - a second short message service (SMS) signal to the service provider-associated computer system and comprising a second secured hash link that is clicked to record a second evidence of service delivery associated with the service provider-associated computer system;
- a processor that records an electronic evidence of service delivery in the service network by transmitting a confirmation electronic message along with a unique service proof token (SPT) to said mobile communication device and to the service provider-associated computer system, wherein said electronic evidence of service delivery is one of an event, a digitally executable location, a digitally executable location voice input, and a digital image;
- a blockchain device directly connected to the electronic device, wherein the block chain device comprises computer-executable instructions comprising a digitally executable SPT associated with said mobile communication device, wherein the digitally executable SPT is an electronic token identifying a start of receipt of service and an end of receipt of service; and
- a client electronic device directly connected to the blockchain device, wherein the client electronic device verifies said electronic evidence of service delivery by retrieving said unique SPT from said blockchain device.

2. The system of claim 1, comprising a first Global Positioning System (GPS) communicatively connected with said client electronic device, wherein said first GPS records location coordinates of the service provider-associated computer system.

3. The system of claim 2, wherein said first GPS is contained within the service provider-associated computer system and communicates with said client electronic device.

4. The system of claim 2, wherein said blockchain device comprises said location coordinates of the service provider-associated computer system.

5. The system of claim 1, comprising a second Global Positioning System (GPS) communicatively connected with said client electronic device, wherein said second GPS records location coordinates of said mobile communication device.

6. The system of claim 5, wherein said second GPS is contained within said mobile communication device and communicates with said client electronic device.

7. The system of claim 5, wherein said blockchain device comprises said location coordinates of said mobile communication device.

8. The system of claim 1, wherein said blockchain device comprises said SPT associated with said mobile communication device and the service provider-associated computer system.

9. The system of claim 8, wherein said SPT comprising:
- a first SPT associated with said mobile communication device and comprising a start of service proof token for receipt of said service detected by said mobile communication device;
- a second SPT associated with said mobile communication device and comprising an end of service proof token for receipt of said service detected by said mobile communication device;
- a third SPT associated with the service provider-associated computer system and comprising a start of service proof token for delivery of said service by the service provider-associated computer system; and
- a fourth SPT associated with the service provider-associated computer system and comprising an end of service proof token for delivery of said service by the service provider-associated computer system.

10. The system of claim 9, wherein said first SPT, said second SPT, said third SPT, and said fourth SPT comprise digitally executable verification of said electronic evidence of service delivery.

11. The system of claim 10, wherein client electronic device is communicatively coupled with a rules engine comprising a set of computer-executable rules that verify proof of evidences based on occurrence of said event, receipt of said digitally executable location information, receipt of said digitally executable voice input, or receipt of said digital image input.

12. The system of claim 1, wherein said blockchain device comprises:
- a network identifier associated with a blockchain network;
- a transaction ID (identifier);
- a blockchain address identifier using at least a unique key included in a transaction request and one or more hashing codes including said SPT associated with said respective mobile communication device; and
- a plurality of data elements comprising a proof of transaction as said evidence reserved for private use upon request for verification by said client electronic device.

13. The system of claim 12, wherein said blockchain address identifier comprises a public key corresponding to a private key that registers a transaction on said blockchain device.

* * * * *